United States Patent [19]

Yoshida

[11] 4,420,817
[45] Dec. 13, 1983

[54] WORD ENDINGS INFLECTION MEANS FOR USE WITH ELECTRONIC TRANSLATION DEVICE

[75] Inventor: Kunio Yoshida, Tsuge, Japan
[73] Assignee: Sharp Kabushiki Kaisha, Osaka, Japan
[21] Appl. No.: 152,846
[22] Filed: May 23, 1980
[30] Foreign Application Priority Data
May 25, 1979 [JP] Japan .................. 54-65377
Jun. 19, 1979 [JP] Japan .................. 54-77738
[51] Int. Cl.³ ........................................... G06F 15/38
[52] U.S. Cl. ............................................. 364/900
[58] Field of Search ... 364/200 MS File, 900 MS File

[56] References Cited
U.S. PATENT DOCUMENTS
3,618,027 10/1971 Feng ........................ 364/900
4,158,236 6/1979 Levy ........................ 364/900
4,159,536 6/1979 Kehoe ....................... 364/900

Primary Examiner—Gareth D. Shaw
Assistant Examiner—Ronni S. Malamud
Attorney, Agent, or Firm—Birch, Stewart, Kolasch & Birch

[57] ABSTRACT

A control circuit of the present invention comprises a first memory for storing entry words, a second memory for storing a certain number of rule patterns according to which the endings of the entry words may be inflected, and an inflection control device responsive to the first memory and the second memory for inflecting the endings of the words by a particular rule pattern developed from the second memory. In another form of the present invention, an encoder is provided for encoding a word entered into first parts of coded information common to words identified as the same and into second parts of coded information having a difference dependent on the kind of the words. The equivalency between the word entered and one of entry words stored in a memory is determined using only the first parts of coded information.

12 Claims, 16 Drawing Figures

| THE KIND OF RULE | A | B | C | D | E |
|---|---|---|---|---|---|
| PRESENT TENSE | none | none | none | e | y |
| THE 3RD PERSON AND SINGULAR | s | s | es | es | ies |
| PRESENT PARTICLE | ing | :ing | ing | ing | ying |
| PRETERITE PAST PARTICLE | ed | :ed | ed | ed | ied |
| EXAMPLES | ask (ask) | stop (stop) | push (push) | love (lov) | carry (carr) |
| | work (work) | fit (fit) | wash (wash) | change (chang) | try (tr) |
| | play (play) | plan (plan) | pass (pass) | receive (receiv) | marry (marr) |
| | keep (keep) | cut (cut) | go (go) | make (mak) | fly (fl) |
| | tell (tell) | set (set) | catch (catch) | give (giv) | |

(INFINITIVE) — THE CHANGE OF THE ENDING(S) OF WORDS BY INFLECTION

FIG. 4(A)

| ... | | |
|---|---|---|
| | aside | |
| | ask | |
| | askance | |
| ... | | |

FIG. 4(B)

| ... | A | ... |
|---|---|---|

FIG. 4(C)

| ... | VT, VI に する | ... |
|---|---|---|

FIG. 5

| $a_1$ | $a_2$ | $a_3$ | $a_4$ | $a_5$ | $a_6$ | $a_7$ | $a_8$ |
|---|---|---|---|---|---|---|---|

FIG. 6(A)

|  | $a_1$ | $a_2$ | $a_3$ | $a_4$ | $a_5$ | $a_6$ | $a_7$ |
|---|---|---|---|---|---|---|---|
| A a | 0 | 0 | 0 | 0 | 0 | 0 | 1 |
| B b | 0 | 0 | 0 | 0 | 0 | 1 | 0 |
| C c | 0 | 0 | 0 | 0 | 0 | 1 | 1 |
| D d | 0 | 0 | 0 | 0 | 1 | 0 | 0 |
| E e | 0 | 0 | 0 | 0 | 1 | 0 | 1 |
| F f | 0 | 0 | 0 | 0 | 1 | 1 | 0 |
| X x | 0 | 0 | 1 | 1 | 0 | 0 | 0 |
| Y y | 0 | 0 | 1 | 1 | 0 | 0 | 1 |
| Z z | 0 | 0 | 1 | 1 | 0 | 1 | 0 |

FIG. 6(B)

|  | $a_8$ |
|---|---|
| a ʃ z | 0 |
| A ʃ Z | 1 |

FIG. 7(A)

── TOILET ──
| 00101001 | 00011111 | 00010011 | 00011001 | 00001011 | 00101001 |

FIG. 7(B)

── Toilet ──
| 00101001 | 00011110 | 00010010 | 00011000 | 00001010 | 00101000 |

FIG. 7(C)

── toilet ──
| 00101000 | 00011110 | 00010010 | 00011000 | 00001010 | 00101000 |

WORD ENDINGS INFLECTION MEANS FOR USE WITH ELECTRONIC TRANSLATION DEVICE

BACKGROUND OF THE INVENTION

The present invention relates in general to a word information storage and retrieval device and, more particularly, to an electronic dictionary and language interpreter for providing efficient and rapid retrievel of any desired word or words stored therein.

Recently, a new type of electronic device called an electronic dictionary and language interpreter has been available on the market. The electronic dictionary and language interpreter is of a unique structure which provides for efficient and rapid retrieval of word information stored in a memory. An example of such an electronic dictionary and language interpreter is disclosed in Levy U.S. Pat. No. 4,158,236, June 12, 1979, "ELECTRONIC DICTIONARY AND LANGUAGE INTERPRETER".

In this type of portable electronic device, a large number of words were required to be stored in a memory. Since the capacity of such a memory was limited to a certain extent, it was very difficult to store many kinds of original, namely, non-inflected words, and inflected words in the memory. Accordingly, in these portable electronic devices, it is further desirable that the capacity of the memory for storing a plurality of kinds of words be minimized by omitting the storage of a great number of kinds of inflected words.

SUMMARY OF THE INVENTION

Accordingly, it is an object of the present invention to provide an improved electronic language interpreter for permitting storage capacity for a memory storing a plurality of words to be minimized.

It is a further object of the present invention to provide an improved electronic language interpreter with the faculties of omitting the memory of a plurality kinds of inflected words, thereby minimizing the storage capacity of a memory.

It is a further object of the present invention to provide an improved electronic language interpreter comprising means for making words inflected pursuant to rules which are stored in a memory.

It is a further object of the present invention to provide an improved electronic language interpreter with the faculties of permitting words consisting of capital letters and having a certain number of capital letters to be examined by a simplified circuit, without any augmentation of the number of entry words to be stored in a memory.

Others objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

To achieve the above objects, pursuant to an embodiment of the present invention, a control circuit of the present invention comprises a first memory for storing non-changed parts of letters of words as entry words, a second memory for storing a certain number of rule patterns according to which the endings of the words are inflected, and an inflection control device responsive to the first memory and the second memory for inflecting the endings of the words by a particular rule pattern developed from the second memory.

In another form of the present invention, an encoder is provided for encoding a word entered into first parts of coded information common to words identified as the same and into second parts of coded information having a difference dependent on the kind of the words. The equivalency between the word entered and one of entry words stored in a memory is determined using only the first parts of coded information.

BRIEF DESCRIPTION OF THE DRAWINGS

The present invention will become more fully understood from the detailed description given hereinbelow and accompanying drawings which are given by way of illustration only, and thus are not limitative of the present invention and wherein.

DESCRIPTION OF THE INVENTION

First of all, any kind of languages can be applied to an electronic language interpreter of the present invention. An input "source" word or words are spelled in a specific language to obtain an equivalent word or words, or a translated word spelled in a different language corresponding thereto. The kind of language can be freely selected. According to an example of the present invention, it is assumed that the specific language is English and the different language is Japanese.

Figure 1:
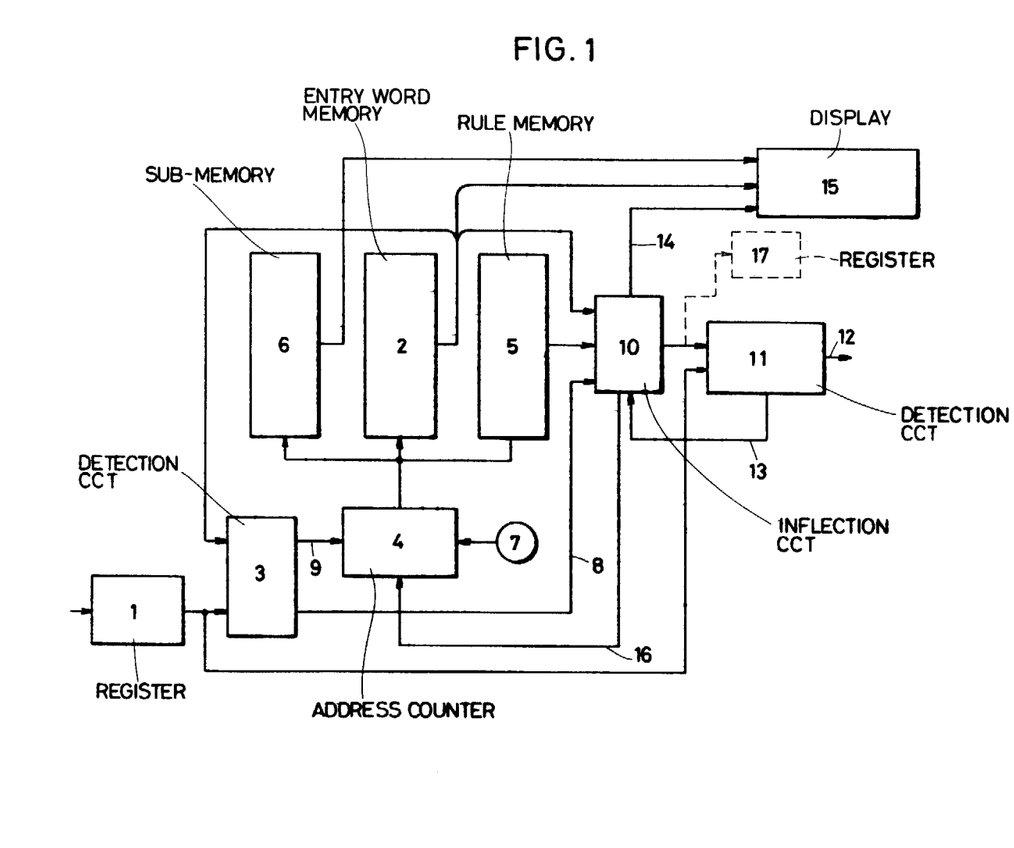
FIG. 1 is a block diagram of a circuit incorporated within an electronic language interpreter according to the present invention.

With reference to FIG. 1 showing a block diagram of a circuit incorporated within the electronic language interpreter according to the present invention, the circuit comprises a register 1, an entry word memory 2, a first detection circuit 3, an address counter 4, a rule memory 5, a sub-memory 6, an inflection circuit 10, a second detection circuit 11, and a display 15.

The register 1 is responsive to an input means such as a keyboard unit for entering a plurality of kinds of input words for temporarily storing one of the inputs words for examination purposes. The keyboard unit comprises keys for alphabetical letters. The input means is actuated to enter particular original words, namely, non-inflected words, or inflected words, as desired. The entry word memory 2 stores a plurality of entry words identical to the original words, non-inflected words and the inflected words, depending on a kind of rule which is described below.

The first detection circuit 3 is provided for comparing the contents of the register 1 and one of the words developed from the entry word memory 2. The address counter 4 is responsive to the output of the first detection circuit 3 for addressing the entry word memory 2, the rule memory 5, the sub-memory 6. The numeral 7 represents signals for directing that a particular word entered into the register 1 should be examined. In response to application of the signals 7, the address counter 4 is reset.

The rule memory 5 stores a certain number of rules each of which is used in connection with any entry words stored in the entry word memory 2. The sub-memory 6 contains information of parts of speech of the entry words of the memory 2 which are assumed to be complete words, information of translated words equivalent to them, and other types of necessary information. The first detection circuit 3 develops output signals entering the address counter 4 only when the word developed from the entry word memory 2 is identical to the word stored in the register 1. For instance when the entry word memory 2 generates information of "tr" and the word stored in the register 1 is "trace", the first detection circuit 3 develops signals identified by the numeral 8 representing the occurrence of consistency. When the entry word memory 2 does not develop a word identical to that of the register 1, it develops signals identified by the numeral 9 representing the occurrence of inconsistency.

The inflection circuit 10 is responsive to the signals 8 representing the occurrence of consistency for making a particular word developed from the entry word memory 2 inflected with the help of the rule memory 5. The second detection circuit 11 determines a correspondence between output signals provided by the infection circuit 10 and those from the register 1. When the correspondence is detected, it generates output signals 12. When not, it provides output signals 13 entering the inflection circuit 10. The inflection circuit 10 is responsive to the output signals 13 for providing inflection of a particular word and then developing output signals introduced into the second detection circuit 11. When the output signals 13 continue to develop from the second detection circuit 11, the inflection circuit 10 counts the number of generations of the output signals 13 and transfers the results to the display 15 as output signals 14. Whenever the output signals 13 are applied to the inflection circuit 10, the inflection circuit 10 provides output signals 16 applied to the address counter 4 for the purpose of advancing the control of the address counter 4.

Figure 2:
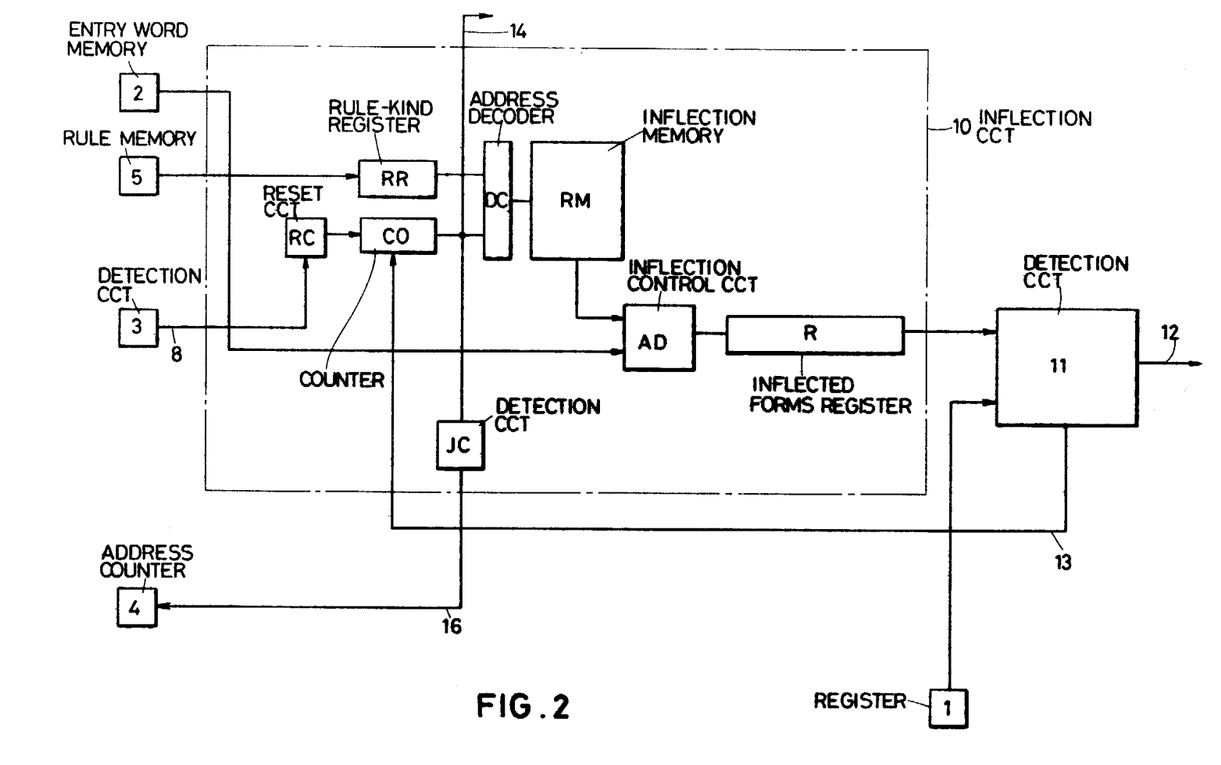
FIG. 2 is a more detailed block diagram of a circuit element included within the circuit shown in FIG. 1.

FIG. 2 represents a more detailed block diagram of the inflection circuit 10. With reference to FIG. 2, the inflection circuit 10 comprises a reset circuit RC, a rule-kind register RR, a counter CO, an address decoder DC, an inflection memory RM, an inflection control circuit AD, an inflection forms register R, and a detection circuit JC.

The counter CO provides the output signals 14. The reset circuit RC is a reset circuit for the counter CO. The detection circuit JC is a circuit for detecting the contents of the counter CO. The inflection memory RM stores a plurality kinds of word endings which are changed for inflecting purposes. The address decoder DC functions as an address decoder for the inflection memory RM. The rule-kind register RR contains the kinds of rules used for providing inflections of the words. The inflection control circuit AD controls inflection operation. The inflected forms register R stores inflected words, temporarily.

More particularly, the detection circuit JC detects that the counter CO is reset, and then prevents the generation of the output signals 16. The reset circuit RC makes the counter CO reset, in response to the application of the output signals 8. Accordingly, when the output signals 8 enter the reset circuit RC, further advancement of the address in the address counter 4 is prevented by the generation of the output signals 16.

At the same time, the kind of rule is entered from the rule memory 5 to the rule-kind register RR. The address decoder DC determines a particular address for the inflection memory RM, relied upon the contents of the rule-kind register RR and the counter CO. The inflection memory RM is controlled by the particular address. The inflection control circuit AD responds to the output from the inflection memory RM and the entry word memory 2 so as to provide the inflection of a particular word applied from the entry word memory 2. The inflection control circuit AD adds the endings of the word developed from the inflection memory RM to the word provided from the entry word memory 2 for the purposes of inflection. The inflected word is transferred to the inflected forms register R.

The second detection circuit 11 compares output signals from the inflected forms register R and those from the register 1. When no correspondence is obtained, it provides the output signals 13 to count up the counter CO. Hence, the inflection memory RM generates the next endings of the word. These next endings are introduced into the inflection control circuit AD together with the word from the entry word memory 2. The inflection control circuit AD provides the inflection using these next endings. The resulting word is applied to the second detection circuit 11 through the inflected forms register R, so that it compares the resulting word with the word from the register 1.

These comparison operations are repeated until the counter CO counts the final number where all the kinds of endings of words used for inflection are generated. The detection circuit JC detects the final number counted by the counter CO and provides the output signals 16.

Figure 3:
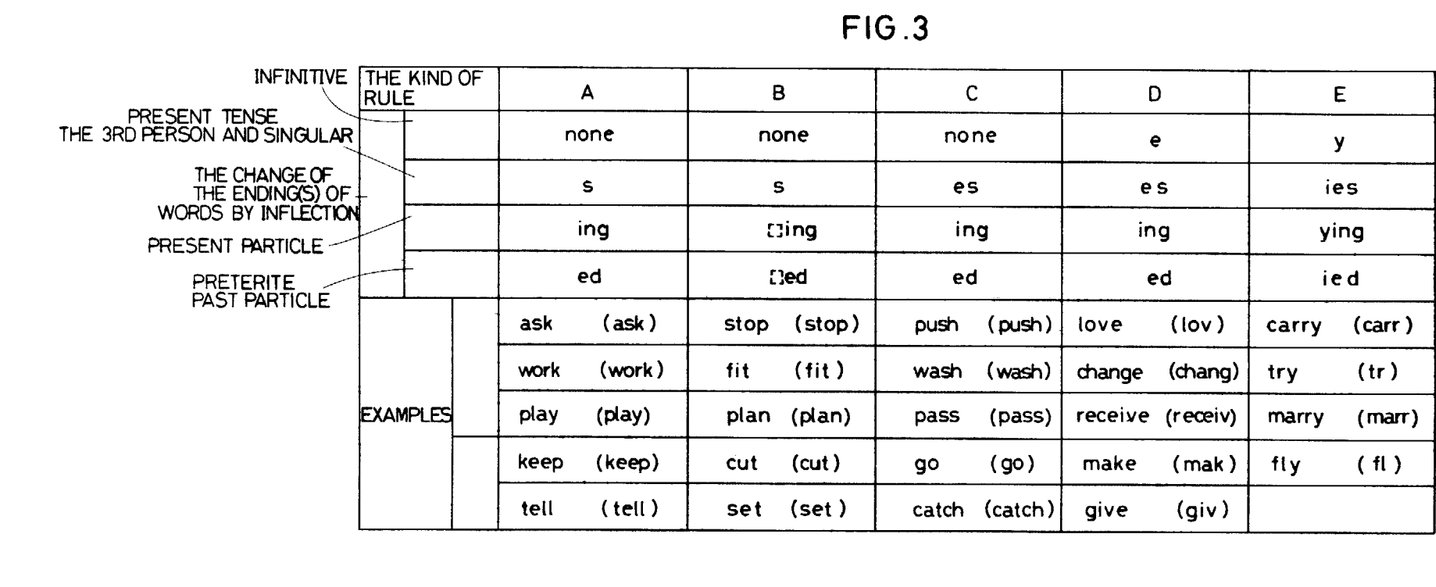
FIG. 3 is a table representing rules of the principle for use with the present invention.

FIG. 3 shows a table representing inflection rules of the principle for use with the present invention. The kind of inflection rules which can be used for the present invention is not limited to these examples directed to conjugated forms of verbs of the English language.

Since irregular verbs can not be classified under any rule, it is necessary that all the forms of the irregular verbs are stored as entry words in the entry word memory 2. As for the rules A, B, and C, infinitive forms are the entry words. As for the rules D and E, the entry words are different from the infinitive forms. In the rules A and B, conjugation letters by the third person and the singular number in the present tense are "s", in the rules C and D, the conjugation letters are "es", and in the rule E, they are "ies". As for the conjunction letters by the present participle, "ing" is used in the rules A, B, C and D, and in the rule B, the last letter of the entry words is represented by the block which is shown by dotted line.

Letters "ying" is used as the conjunction letters in the rule E. Concerning the preterite and the past participle, "ed" is added in the rules A, B, C, and D, and "ied" is added in the rule E. Some examples of words classified in the respective rules are listed, wherein the letters provided within brackets are the entry word and lower groups of the preterite examples of words show regular conjugation except the preterite and the past participle and, in such a case, such irregular conjugation forms are required to be stored as the entry words.

The operation of the circuit shown in FIG. 1 is explained by the assumption that a particular English word "asked" is introduced into the register 1. By the generation of the signals 7, the address set in the address counter 4 is reset. The address of the address counter 4 subsequently proceeds until the entry word memory 2 generates a word identical to the word "asked" stored in the register 1 or a word containing some letters identical to the word "asked" of the register 1.

Figure 4A:
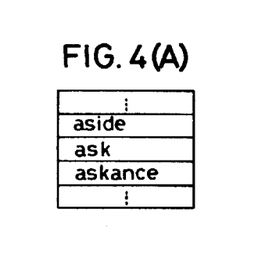
FIGS. 4(A) through 4(C) show the contents of a memory wired in the circuit shown in FIG. 1.

If the entry word memory 2 stores entry words as shown in FIG. 4(A), it provides these words progressively. When it develops a word "ask" having some letters identical to the word "asked" of the register 1, the first detection circuit 3 provides the output signals 8 representing the occurrence of the correspondence. The address counter 4 stops its counting operation. By the generation of the output signals 8, the inflection circuit 10 operates so that it provides the inflection of the letters "ask" developed from the entry word memory 2 with the help of the rule A generated from the rule memory 5.

In the inflection circuit 10, the addition of the several kinds of endings to the word "ask" is performed by the rule A. More particularly, the word "ask" is applied to the second detection circuit 11 without any change, so that the comparison between the word "ask" and the word "asked" temporarily stored in the register 1 is detected. Presently, as the inconsistency is detected, the second detection circuit 11 provides the output signals 13 showing the occurrence of the inconsistency, so that the inflection circuit 10 is controlled to provide the following inflected words. Then the inflection circuit 10 provides a further inflected word "asks" with the help of the inflection memory RM and other circuit elements as described in connection with FIG. 2. When the inflected word "asked" produced by the inflection circuit 10 is entered to the second detection circuit 11, the second detection circuit 11 develops output signals 12 showing the occurrence of the correspondence, so that the examination of the word "asked" is terminated. The output signals 12 are applied to the display 15 for initiating display operations of the display 15.

At the same time, the sub-memory 6 provides the information about the part of speech, the translated word, and other information in connection with the word "asked", under the control by the address counter 4. Therefore, the display 15 indicates the entry word "ask" corresponding to the word "asked" which is examined, the part of speech, the translated word, and other information in connection with the word "asked".

Figure 4B:
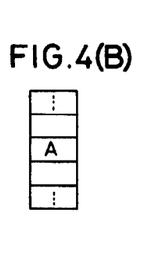
Figure 4C:
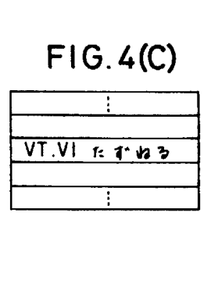

FIG. 4(B) shows the contents of the rule-memory 5 and FIG. 4(C) shows those of the sub-memory 6.

If a further register 17 is additionally connected to the inflection circuit 10 for storing the infinitive form of the present tense which is obtained as the first inflected word according to an example of the present invention, it may be possible that the infinitive form is pointed out in the display 15 coupled to the register 17. As the order in which several inflected forms are obtained is normalized by the counter CO included within the inflection circuit 10 for counting the number of the occurrence of the output signals 13 and for being reset by the output signals 8, a kind of inflected form formed by the inflection circuit 10 and identified to correspond to the word entered can be shown.

When a particular word "carriage" is entered to the register 1, the word contains letters of "carr" and the first detection circuit 3 determines the correspondence between the letters of "carr" developed from the entry word memory 2 and the word. The letters "carr" are also non-changed parts of the word "carry". However, the word "carriage" of the register 1 is determined to be inconsistent with the outputted word from the inflection circuit 10 by the second detection circuit 11. The inflection circuit 10 provides the output signals 16, so that the correspondence between the word "carriage" of the register 1 and a word next to the letters "carr" is subsequently determined by the first detection circuit 3.

When a past participle word "cut" is entered to the register 1, it is determined as an infinitive word during the detection of correspondence by the first and the second detection circuits 3 and 11. In such a case, it may be necessary that information of conjugation manner is stored in the submemory 6.

The above description relates to the conjugation of verbs. It is apparent that the declension of nouns, pronouns, and adjectives is controlled in a similar manner, thereby minimizing the number of entry words of nouns, pronouns, and adjectives to be stored in the entry word memory 2.

Of course, other memories such as the rule-memory 5 and the sub-memory 6 are required for this purpose, but the provision of these memories is preferable to the augmentation of the number of the entry words to be stored in the entry word memory 2 in that the total memory capacity is minimized and time periods needed for the retrieval of a particular word become short.

It can be considered that the inflection circuit 10 provides as inflected words "fly", "flies", "flying" and "flied" based on the entry of a word "fly". Clearly, the preterite word "flied" is wrong and the preterite word "flew" and the past participle word "flown" are correct. However, in fact, the word "flied" is not possible to be entered into the register 1 as it is wrong. Even if the inflection circuit 10 provides wrong words, the entry of these wrong words may not be possible and the correspondence is not detected. There are no problems in practice.

The display 15 is responsive to the information outputted by the entry word memory 2 (otherwise the register 17) and the sub-memory 6 for indicating infinitive and complete words related to the entry words, the part of speech, the translated word, and other information in connection with the infinitive and complete word which is examined. The display 15 is further responsive to the output signals 14 from the inflection circuit 10 for representing what inflected form from the entry word is presently examined and developed. When a word "stopped" is examined and shown, for example, the display 15 indicates: a translated word of Japanese equivalent to the entry word "stop" corresponding to the word "stopped", the infinitive word "stop" by the entry word "stop", and the indication of the preterite and the past participle forms of the entry word "stop".

As stated above, the circuit of the present invention comprises a first memory for storing non-changed parts of letters of words, a second memory for storing a certain number of rule patterns according to which the endings of the words are inflected, and means responsive to the first memory and the second memory for inflecting the endings of the words. By the present invention, the number of entry words to be stored in the first memory is minimized, even when inflected words are examined. Capacity of the total memory comprising the first memory and the second memory can be reduced.

Figure 5:
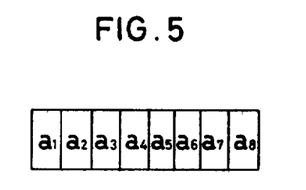
FIG. 5 represents a bit construction made in a register.

A further description is directed to another embodiment of the present invention as shown in FIGS. 5 thrugh 11. An object of this embodiment is to permit words consisting of capital letters and having a certain number of capital letters to be examined by a simplified circuit of the present invention, without any augmentation of the number of entry words to be stored in a memory.

Figure 6A:
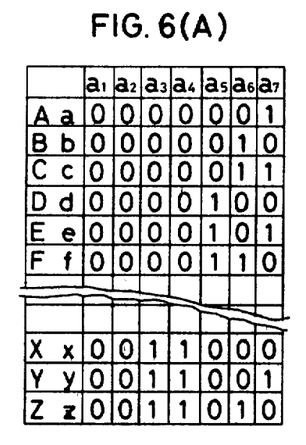
FIGS. 6(A) and 6(B) show a table of coded information of alphabetical letters for use with the present invention.
Figure 6B:
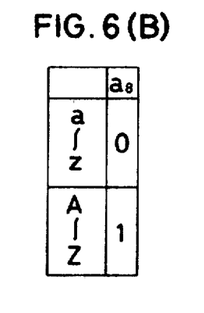

FIG. 5 shows the contents of a register for storing a word formed by 8 bits ($a_1 \ldots a_8$). FIGS. 6(A) and 6(B) show a table summarizing coded information corresponding to all alphabetical letters. Pairs of capital letter and its small letters such as (A, a), (B, b) ... (Z, z) are both represented by 7 bits of $a_1 \ldots a_7$ as shown in FIG. 6(A). A distinction between the capital letter and the small letter is directed by the eighth bit, $a_8$, as shown in FIG. 6(B), wherein $a_8$ bit of the capital letter is "1" and $a_8$ bit of the small letter is "0".

Figure 7A:
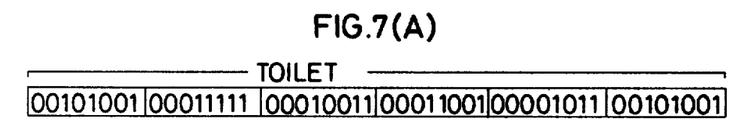
FIGS. 7(A) through 7(C) show a procession of coded information forming a particular word for use in the present invention.
Figure 7B:
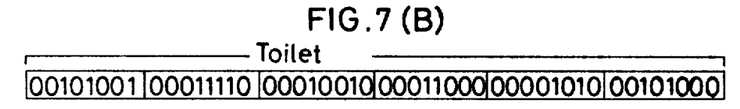
Figure 7C:
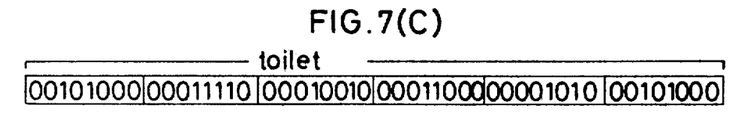

FIGS. 7(A) through 7(C) represent examples of processions of coded information forming a particular word, wherein "TOILET" is identified by the procession of FIG. 7(A), "Toilet" is by the procession of FIG. 7(B) and "toilet" is by the procession of FIG. 7(C).

The detection of the correspondence between a particular word entered and a word stored is obtained by the seven bits $a_1, \ldots, a_7$ which are common to the capital letter and the small letter. Therefore, when only the word "toilet" is stored in the memory, the words "TOILET" and "Toilet" which are externally introduced are determined to be equivalent to the word "toilet". It is unnecessary that the words "TOILET" and "Toilet" are stored as entry words, in addition to the words "toilet". Accordingly, the number of entry words to be stored in the memory are small, thereby the capacity of the memory being minimized to a great extent.

Figure 8:
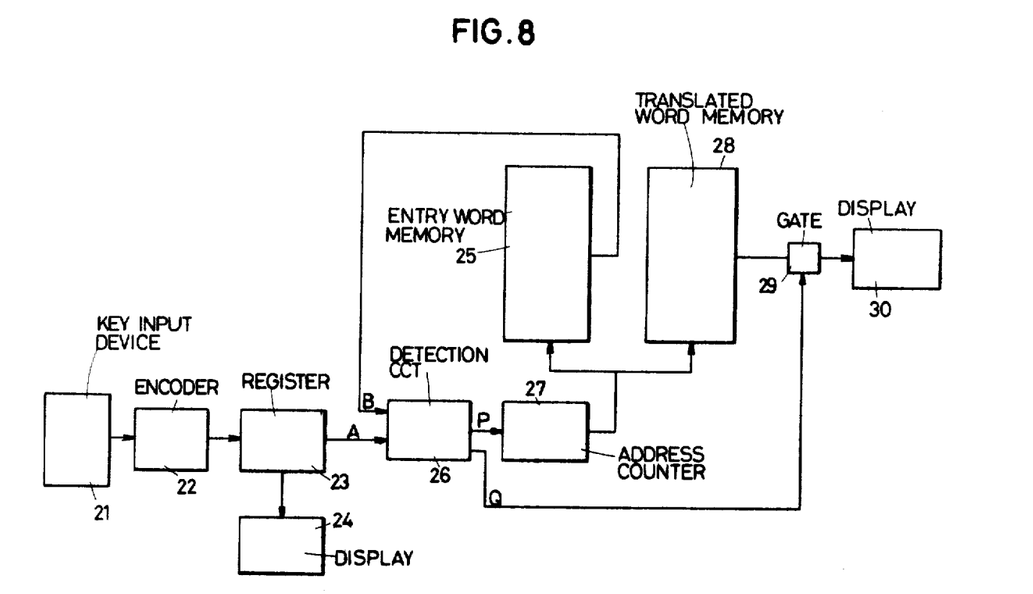
FIG. 8 shows a block diagram of a circuit for use with the present invention.

FIG. 8 shows a block diagram of a circuit of the electronic language interpreter according to another embodiment of the present invention.

In FIG. 8, the circuit comprises a key input device 21, an encoder 22, a register 23, a first display 24, an entry word memory 25, a translated word memory 28, a detection circuit 26, an address counter 27, a gate 29, and a second display 30.

The key input device 21 comprises a keyboard unit comprising keys of alphabetical letters in capital letters and small letters, and of Japanese "kana" characters and Japanese "katakana" characters. The keyboard unit further comprises a certain number of function keys for controlling operation of the keys, as desired.

The encoder 22 is provided for encoding information of words entered into the coded information as summarized in FIGS. 6(A) and 6(B). For example, the word "TOILET" is assumed to be introduced by the key input device 21, so that the procession of bits, as shown in FIG. 7(A), comprising 8 bits $\times 6 = 48$ bits in the form of the coded information is produced by the encoder 22.

The register 23 temporarily stores the procession of coded information. The first display 24 is connected to the register 23 for showing the word entered by the key input device 21 and defined by the procession. The entry word memory 25 contains a great number of entry words. The detection circuit 26 is provided for determining the correspondence between the word developed by the register 23 and one of the entry words subsequently generated by the entry word memory 25. The translated word memory 28 stores a great number of translated words equivalent to the entry words stored in the entry word memory 25.

The address counter 27 addresses the entry word memory 25 and the translated word memory 28, simultaneously. Since one entry word in the entry word memory 25 is stored in the same address as one translated word in the translated word memory 28, the translated word corresponding to the entry word, the development of the entry word by the address counter 27 is equivalent to the development of the translated word by the address counter 27.

When the correspondence between the word entered and one of the entry words developed by the entry word memory 25 is detected by the detection circuit 26, the detection circuit 26 generates output signals denoted as Q representing the presence of the correspondence.

The output signals Q are admitted to the gate 29 to make it conductive, so that the translated word corresponding to the entry word determined to be consistent with the word entered is transferred from the translated word memory 28 to the second display 30.

For example, a particular word "Toilet" is assumed to be introduced by the key input device 21, so that the procession of FIG. 7(B) is applied to the register 23. The word "Toilet" is indicated by the first display 24. In response to the entry of the coded procession, the address counter 27 is reset and, subsequently, begins to address the entry word memory 26 and the translated word memory 28. By the first address defined by the address counter 27, a first entry word is developed from the entry word memory 25 to the detection circuit 26. The detection circuit 26 determines the equivalency between the word "Toilet" and the first entry word.

If the equivalency is not obtained, the detection circuit 26 generates output signals identified by P implying the presence of the inconsistency so that the address set in the address counter 27 proceeds by one. Accordingly, a second entry word is developed from the entry word memory 25 to the detection circuit 26.

This operation is repeated until an entry word equivalent to the word "Toilet" is generated from the entry word memory 25. When the correspondence is obtained, the detection circuit 26 prevents further operation of the address counter 27 by admitting output signals indicated by P to it. Simultaneously, it generates the output signals of Q so that the gate 29 is changed to be conductive. The translated word corresponding to the entry word examined is developed from the translated word memory 28 to the second display 30. The second display 30 indicates the translated word. It is evident that the first display 24 is combined with the second display 30 to make a single display unit.

Figure 9:
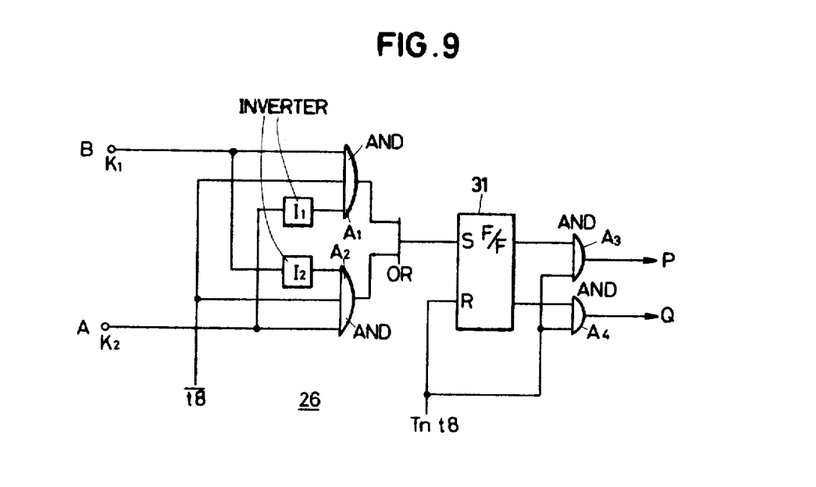
FIG. 9 shows a more detailed block diagram of a circuit element included within the circuit represented in FIG. 8.

FIG. 9 shows a more detailed block diagram of the detection circuit 26. In FIG. 9, the detection circuit 26 comprises two inverters I1 and I2, four AND gates A1, A2, A3 and A4, and OR gate, and a flip flop 31. A terminal of K1 of the detection circuit 26 has the coded word information identified as B developed from the entry word memory 25 and another terminal of K2 has the coded word information specified by A developed from the register 23. These kinds of word information A and B are compared by the detection circuit 26. Information designated by a logical formula B·$\bar{A}$·$\bar{t_8}$ is applied to the AND gate A1. Another kind of information designated by a logical formula A·$\bar{B}$·$\bar{t_8}$ is entered to the AND gate A2. By the detection circuit 26, only the seven bits which are common to a capital letter and its small letter are determined to be consistent.

As the OR gate is coupled to the AND gates A1 and A2, either of the AND gates A1 and A2 develops its output signals so that the flip flop 31 is turned set. Signals having timing of Tn,t8 implying the last bit of a word are applied to the reset terminal of the flip flop 31, and the AND gates A3 and A4. Under timing of Tn,t8, output signals P are developed from the AND gate A3, representing the occurrance of the inconsistency.

If the consistency is detected, the flip flop 31 is not set, so that the AND gate A3 does not provide its output signals. Alternatively, output signals of Q are developed from the AND gate A4, representing the occurrence of the consistency by the timing of Tn t8.

The two kinds of word information A and B are developed according to timing TO-Tn by which a particular word is transferred. Each of TO-Tn has bit timing signals of t1-t8 as shown in FIG. 10.

By neglecting timing of $\bar{t_8}$, the output signals from the OR gate are in a level of "1" when the two kinds of word information A and B are not equivalent. The flip flop 31 is turned set. Once the flip flop 31 is turned which is placed in set conditions, the address of the address counter 27 subsequently proceeds.

By the application of $\bar{t_8}$ into the AND gates A1 and A2, these AND gates A1 and A2 do not provide any output signals, independent on the application of the two kinds of word information A and B. The eighth bit a8 used for distingushing a capital letter from its small letter is controlled to be applied with timing of t8. The comparison between the words is disenabled in this bit a8. Accordingly, the processions of FIGS. 7(A) and 7(B) are presumed to be equivalent to the procession of FIG. 7(C).

Figure 10:
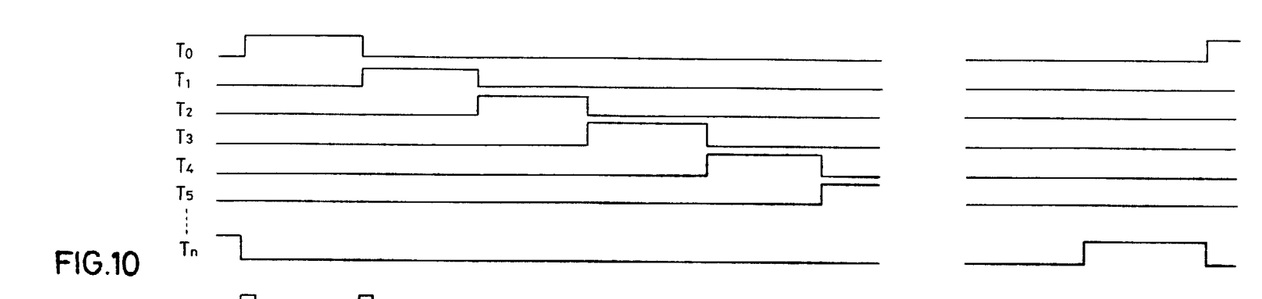
FIG. 10 shows various signals occurring within the circuit shown in FIG. 8.

FIG. 10 shows a timing chart of various signals occurring with the detection circuit 26 of FIG. 9. Signals of To-Tn are used to transfer a particular word. Each of them has bit timing signals of t1-t8. Magnitude of "n" depends upon the number of letters to be stored in the register 23.

Figure 11:
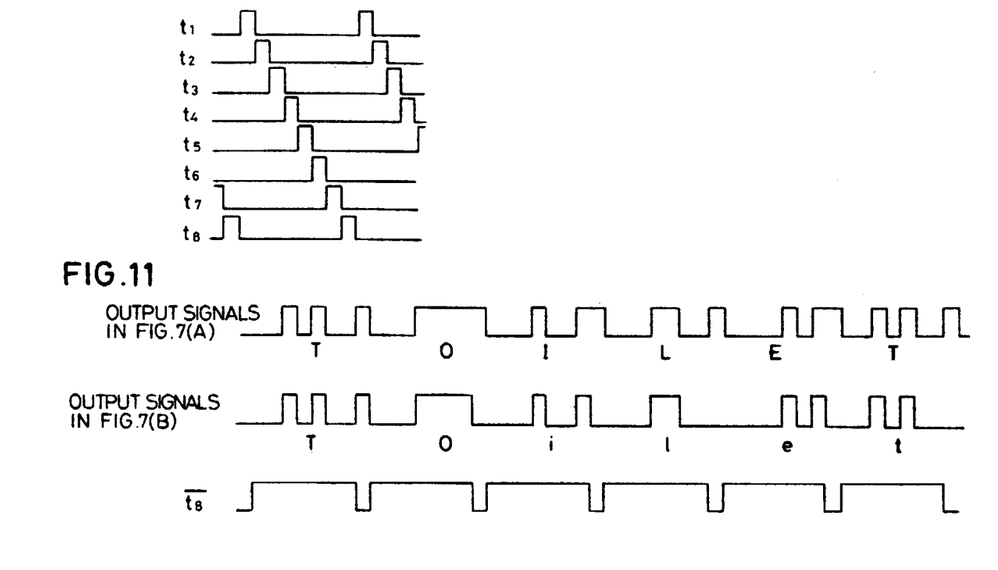
FIG. 11 shows signals in connection with the processions shown in FIGS. 7(A) and 7(B).

FIG. 11 represents two kinds of output signals in FIGS. 7(A) and 7(B) for comparison purposes. The output signals of FIG. 11 are equivalent to the processions as shown in FIGS. 7(A) and 7(B).

Another embodiment of the present invention is described regarding representation by one or more capital letters and small letters. It will be evident that the Japanese "kana" characters and the Japanese "katakana" characters are identified in the similar manner by allocating bit information which is not compared.

Further, it will be evident that a latter having a umlaut used for, for example, the German language, is identified with a letter having no umlaut by allocating such bit information of, say, 2 bits which is not compared. In such a case, A=a=Ä=ä is presumed. As is known, in the German language, "Väter" is the plural form of "vater". The word "Väter" is not required to be stored in the entry word memory 25 as an entry word since the word "Väter" which is entered externally is determined to be consistent with the word "Vater" stored and, then the word "Väter" is developed by making the word "Vater" inflected according to the embodiment of the present invention as stated herein or by additionally storing the word "Väter" as usual. In response to the entry of the word "Väter", it is detected that the word "Väter" is the plural form of "Vater".

As stated above, the coded word information of the present invention comprises first parts which are determined to be consistent with the entry words stored and, second parts which are not compared. By only the first parts, the coded word information is identified as one of the entry words. In addition to the above description, synonyms, words meaning the same as another word but different from it in the spelling based on the difference between two nations, other kinds of words considered to be identical in fact can all be utilized in the present invention. These kinds of words can be retrieved by the present invention without any augmentation of the number of the entry words to be stored in the memory, thereby the memory capacity being minimized.

The invention being thus described, it will be obvious that the same may be varied in many ways. Such variations are not to be regarded as a departure from the spirit and scope of the invention, and all such modifications are intended to be included within the scope of the fóllowing claims.

What is claimed is:

1. An electronic dictionary and language interpreter device wherein a first word represented in a first language is entered to obtain a second word represented in a second language equivalent to the first word,
   input means for entering first words, said first words having a first uninflected portion and a second inflected portion;
   first memory means provided for storing a plurality of entry words composed of the first uninflected portions of said first words;
   second memory means provided for storing a certain number of rule patterns according to which inflected forms of said first words may be constructed from one of the entry words;
   means responsive to the input means for addressing the first memory means and the second memory means to subsequently retrieve the entry words and the rule patterns associated therewith;
   inflection control means responsive to the addressing means for inflecting the entry words according to the rule pattern; and
   means responsive to the inflection control means for determining the equivalency between the first word entered and the inflected word formed from the entry words by the inflection control means.

2. The device as claimed in claim 1, further comprising third memory means provided for storing a plurality of translated words corresponding to the entry words stored in the first memory means.

3. The device as claimed in claim 1, further comprising display means responsive to the first memory means for displaying entry words.

4. The device as claimed in claim 1, further comprising first detection means connected to the first memory means and the input means for determining the equivalency of letters between one of the entry words and the first word, the first detection means being further connected to the addressing means and the inflection control means for controlling the operation thereof, and
second detection means connected to the inflection control means and the input means for determining the equivalency of letters between the inflected words formed and the first word.

5. The device as claimed in claim 1, further comprising register means connected to the inflection means means for storing a selected form of the inflected words formed by the inflecting means.

6. The device as claimed in claim 5, wherein the register means is further connected to display means for indicating the selected form of the inflected words formed.

7. The device as claimed in claim 4, wherein the inflection control means comprises:
means coupled to the second memory means for storing a particular rule pattern developed from the second memory means;
fourth memory means for storing information used to change endings of a word for inflection purposes;
second addressing means coupled to the storing means and the fourth memory means for selectively addressing the fourth memory in accordance with the particular rule pattern in the storing means so as to select a type of ending from the fourth memory means; and
control means coupled to the fourth memory and the first memory means for inflecting one of the entry words from the first memory means using the ending selected from the fourth memory means.

8. The device as claimed in claim 7, further comprising counting means connected to the second detection means for counting the number of output signals developed from the second detection means, the output signals representing the occurrence of inconsistency of the letters between one of the inflected forms and the first word, said counting means continually actuating said second addressing means until no output signals are produced by said second detection means.

9. The device as claimed in claim 8, further comprising display means coupled to the inflection control means for displaying the information generated from said inflection control means.

10. The device as claimed in claim 2, further comprising display means coupled to the third memory means and detection means, the detection means being coupled to the inflection control means and the input means for determining the equivalency of letters between the inflected words formed and the first word, for indicating the associated translated words.

11. An electronic dictionary and language interpreter device wherein a first word represented in a first language is entered to obtain a second word represented in a second language equivalent to the first word, comprising:
input means for entering selected types and forms of the respective characters of said first word;
encoder means responsive to said input means for encoding the first word into first parts of coded information identifying each of the respective types of characters that form said first word and into second parts of coded information which further identify the specific form of each of said types of characters;
display unit means responsive to both said first and second parts of coded information generated by said encoder means for displaying the specific type and form of character information entered by said first input means;
first memory means for storing a plurality of entry words corresponding only to said first parts of said first words defined by coded information related to character type;
address means for addressing the first memory means for selectively retrieving said entry words therefrom;
detection means responsive to the encoder means and the first memory means for determining the equivalency between the first word and one of the entry words based only on the correspondence between said first parts of coded information, the detection means causing said address means to search said first memory means until said correspondence occurs; and
second memory means provided for storing a plurality of translated second words corresponding to said entry words of said first memory means, said second memory means also being addressed by said address means to selectively retrieve said translated second word in response to a determination of equivalency by said detection means;
said display unit means also being responsive to said detection means for displaying the translated second words retrieved by said address means.

12. The device as claimed in claim 11, wherein said display unit means comprises:
first display means for displaying said specific type and form of character information entered by said first input means; and
second display means for displaying said translated second words.

* * * * *